United States Patent [19]
Shoji et al.

[11] Patent Number: 5,721,069
[45] Date of Patent: Feb. 24, 1998

[54] NONAQUEOUS ELECTROLYTE SECONDARY BATTERY

[75] Inventors: Yoshihiro Shoji; Yasuyuki Kusumoto; Mikiya Yamasaki; Toshiyuki Nohma; Koji Nishio, all of Osaka, Japan

[73] Assignee: Sanyo Electric Co., Ltd., Osaka, Japan

[21] Appl. No.: 760,567

[22] Filed: Dec. 4, 1996

[30] Foreign Application Priority Data

Dec. 6, 1995 [JP] Japan .................. 7-345132

[51] Int. Cl.$^6$ .................. H01M 4/60; C25B 11/00
[52] U.S. Cl. .................. 429/213; 429/216; 429/215; 204/290 R
[58] Field of Search .................. 204/280, 290 R; 429/215, 217, 245, 213

[56] References Cited

U.S. PATENT DOCUMENTS

| | | | |
|---|---|---|---|
| 3,877,983 | 4/1975 | Hovsepian | 136/6 LN |
| 5,340,670 | 8/1994 | Takami et al. | 429/194 |
| 5,380,606 | 1/1995 | Itou et al. | 430/3 |
| 5,527,638 | 6/1996 | Kinoshita et al. | 429/101 |

FOREIGN PATENT DOCUMENTS

| | | |
|---|---|---|
| 4342966 | 11/1992 | Japan . |
| 6215761 | 8/1994 | Japan . |

OTHER PUBLICATIONS

Patent Abstracts of Japan, vol. 17, No. 199, Apr. 19, 1993 JP04342966 (Yuji et al.).

Patent Abstracts of Japan, vol. 96, No. 11, Nov. 29, 1996 JP08190912 (Masanori et al.).

Caplus abstract of JP07335221 (Oohashi et al.), Dec. 22, 1995.

*Primary Examiner*—T. Tung
*Assistant Examiner*—Alex Noguerola
*Attorney, Agent, or Firm*—Birch, Stewart, Kolasch & Birch, LLP

[57] ABSTRACT

Disclosed is a nonaqueous electrolyte secondary battery including a negative electrode prepared by coating a substrate with a slurry comprising a carbon material, an alkali metal salt of carboxymethylcellulose, and a styrene-butadiene rubber and drying it, the alkali metal salt accounting for 0.5~2 weight % of the total weight of the carbon material, styrene-butadiene rubber, and CMC alkali metal salt. Because of the higher electrical conductivity of the CMC alkali metal salt used as the thickening agent than the conventional carboxymethylcellulose or its ammonium salt, the secondary battery of the invention including the above negative electrode has an excellent load characteristic.

3 Claims, 1 Drawing Sheet

NONAQUEOUS ELECTROLYTE SECONDARY BATTERY

FIELD OF THE INVENTION

The present invention relates to a nonaqueous electrolyte secondary battery using a carbon material as a negative electrode material and more particularly to improvements in the negative electrode which contribute to an improved load characteristic (discharge characteristic at a high current density).

BACKGROUND OF THE INVENTION

This application claims the priorities of Japanese Patent Application No. 7-345132 filed on Dec. 6, 1995.

In recent years, nonaqueous electrolyte secondary batteries represented by lithium secondary batteries have been attracting attention because of their superior adaptability to high voltage, high energy density requirements as compared with the earlier alkaline secondary batteries. As the negative electrode material for secondary batteries of this type, metallic materials such as lithium metal etc. were initially contemplated. However, in view of the risk of internal short circuits arising from dendritic growth of electrodeposits due to successive cycling, most commercial batteries are fabricated using a carbon material such as coke or graphite, which is free of the abovementioned drawback, as the negative electrode material.

The negative electrode utilizing carbon as the negative electrode material is generally fabricated by coating a substrate, such as copper foil, with a slurry comprising a carbon material, a binder, and a thickening agent and drying the coat. As preferred auxiliaries, styrene-butadiene rubber (SBR) has been proposed for the binder and either carboxymethylcellulose (CMC) or carboxymethylcellulose ammonium (CMC-NH$_4$) for the thickener (JP Kokai H4-342966 and JP Kokai H6-215761).

However, the nonaqueous electrolyte secondary battery in which CMC or CMC-NH$_4$ is used as the thickening agent has the disadvantage that because the electrical conductivity of the negative electrode is drastically decreased by the presence of this thickening agent, its load characteristic is poor.

OBJECT AND SUMMARY OF THE INVENTION

Having been developed to overcome the above disadvantage, the present invention has for its object to provide a nonaqueous electrolyte secondary battery possessed of high negative electrode conductivity and a very satisfactory load characteristic.

The nonaqueous electrolyte secondary battery of the present invention (hereinafter referred to sometimes as the cell or battery of the invention) includes a negative electrode fabricated by coating a substrate with a slurry comprising a carbon material, an alkali metal salt of carboxymethylcellulose, and styrene-butadiene rubber and drying it, said alkali metal salt accounting for 0.5–2 weight % of the total mix consisting of said carbon material, styrene-butadiene rubber, and alkali metal salt.

DETAILED DESCRIPTION OF THE INVENTION

Figure 1:
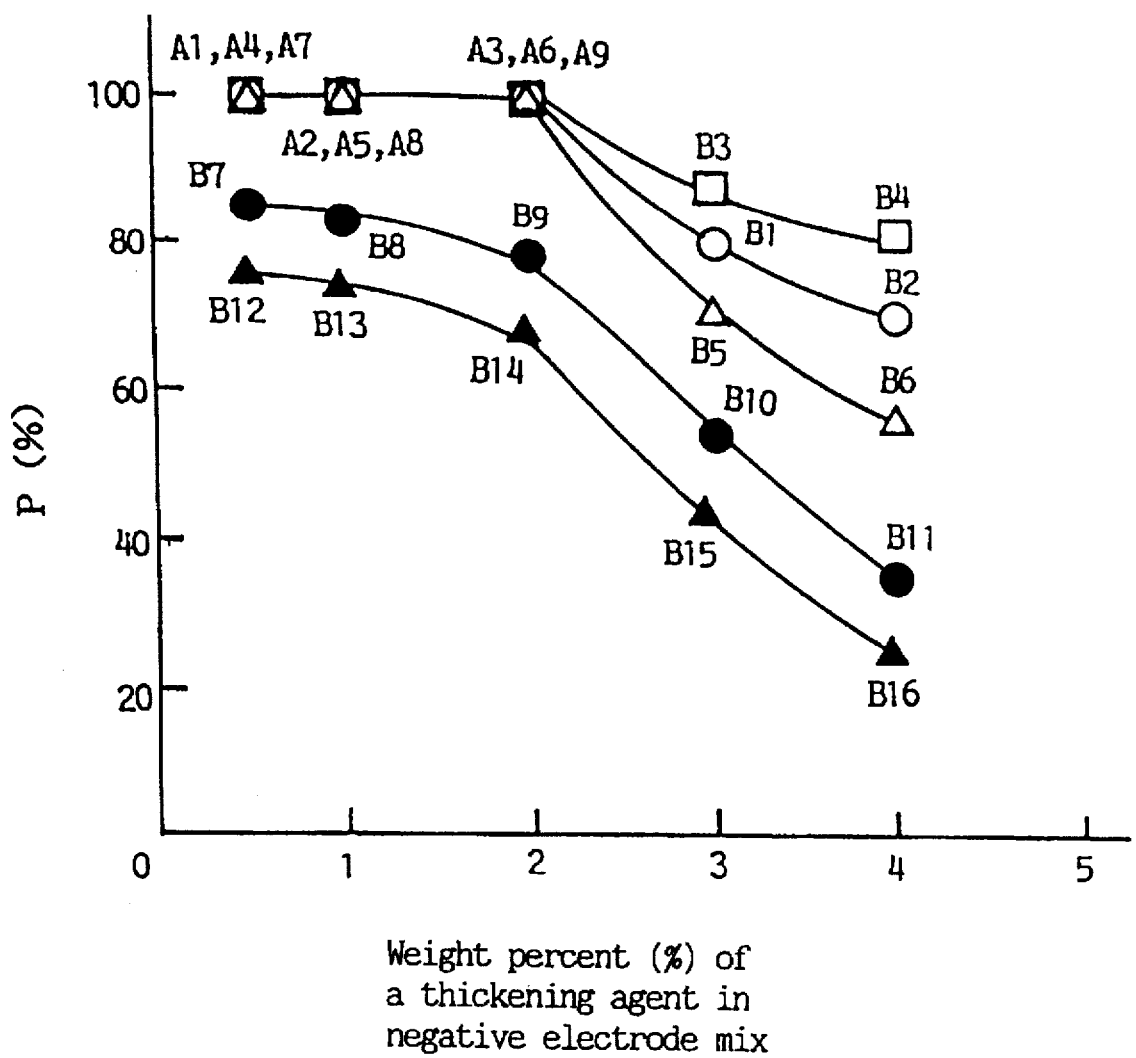
FIG. 1 is a graph showing the load or dynamic characteristics of representative batteries of the invention and of comparative batteries.

The carbon material that can be used as a negative electrode material includes coke, graphite, and carbonization products of organic precursors, among others. Particularly preferred is a carbon material having a crystallite size in the direction of c-axis (Lc) of not less than 150 Å and a lattice plane (002) d value ($d_{002}$) of not greater than 3.38 Å. Provided that the proportion of said carboxymethylcellulose alkali metal salt in the negative electrode is within the above-defined range (0.5–2 weight %), a nonaqueous electrolyte secondary battery with a very satisfactory load characteristic can be implemented by using a high-graphitization-degree carbon having Lc and $d_{002}$ values within the above-mentioned respective ranges.

The alkali metal salt of carboxymethylcellulose for use as a thickening agent may for example be the corresponding sodium salt, potassium salt, or lithium salt.

As a dispersion medium, a nonaqueous solvent can be employed but water is used with advantage.

The substrate for the negative electrode may be a copper foil or a nickel foil, to mention just a few preferred materials.

The negative electrode according to the present invention comprises a substrate and, as formed on either side thereof, a negative electrode mix layer containing said alkali metal salt of carboxymethylcellulose in a proportion of 0.5–2 weight % based on the total weight of said carbon, styrene-butadiene rubber (nonvolatile matter), and alkali metal salt. If the proportion of the alkali metal salt is less than 0.5 weight %, the viscosity of the slurry will not be adequate enough for practical fabrication of the electrode. On the other hand, if the proportion of the alkali metal salt exceeds 2 weight %, the electrolyte will not easily penetrate into the negative electrode so that the load characteristic will be adversely affected. This tendency is more pronounced with an increasing proportion of the alkali metal salt. The preferred proportion of styrene-butadiene rubber is 0.3–1 weight % based on the total weight of said carbon material, styrene-butadiene rubber (nonvolatile matter), and alkali metal salt.

The solvent for the nonaqueous electrolyte that can be used includes ethylene carbonate, propylene carbonate, butylene carbonate, vinylene carbonate, cyclopentanone, sulfolane, 3-methylsulfolane, 2,4-dimethylsulfolane, 3-methyl-1,3-oxazolidin-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolane, methyl acetate, ethyl acetate, and mixtures of two or more kinds of such solvents. The solute for the nonaqueous electrolyte includes but is not limited to LiPF$_6$, LiBF$_4$, LiClO$_4$, LiCF$_3$SO$_3$, LiAsF$_6$, LiN(CF$_3$SO$_2$)$_2$, and LiOSO$_2$(CF$_2$)$_3$CF$_3$.

The positive electrode material that can be used is not particularly restricted, either. Thus, any of the known materials, such as LiCoO$_2$, LiNiO$_2$, LiMnO$_2$, LiVO$_2$, LiNbO$_2$, etc., can be employed.

Since the alkali metal salt used as the thickening agent in the present invention has a higher electrical conductivity than carboxymethylcellulose or its ammonium salt, the thickener-associated loss of electrical conductivity of the negative electrode is small. Therefore, the battery of the invention has a very satisfactory load characteristic.

The present invention is not only applicable to the lithium secondary battery but can be broadly applied to a variety of nonaqueous electrolyte secondary cells using a carbonaceous substance as the negative electrode material.

DESCRIPTION OF THE PREFERRED EMBODIMENTS

The following examples are intended to illustrate the present invention in further detail and should by no means be construed as defining the scope of the invention. Thus, many changes and modifications can be made by those skilled in the art without departing from the spirit and scope of the appended claims.

EXAMPLES 1~3

Fabrication of a Positive Electrode

Ninety-five (95) parts by weight of a 9:1 (w/w) mixture of $LiCoO_2$ powder (active material) having an average particle diameter of 5 μm and an artificial graphite powder (conductive agent) was kneaded with 5 parts by weight of a 5 wt. % solution of poly(vinylidene fluoride) (PVdF) in N-methyl-2-pyrrolidone (NMP) to prepare a positive electrode mix slurry. This positive electrode mix slurry was coated on both sides of an aluminum foil (substrate, current collector) by the doctor blade coating technique and dried in vacuo at 150° C. for 2 hours to provide a positive electrode comprising an aluminum foil and, as formed on either side thereof, a 50 μm thick positive electrode mix layer.

Fabrication of Negative Electrodes

A natural graphite powder having an average particle diameter of 20 μm [crystallite dimension in the direction of c-axis (Lc)>1000 Å; lattice plane (002) d value ($d_{002}$)=3.35 Å], was kneaded with a styrene-butadiene rubber latex, carboxymethylcellulose sodium (CMC—Na), and water to prepare negative electrode mix slurries with graphite-rubber-sodium salt weight ratios of 99–X:1:X (where X=0.5, 1, or 2). These negative electrode mix slurries were respectively coated on both sides of a copper foil (substrate, current collector) by the doctor blade method and dried in vacuo at 110° C. for 2 hours. In this manner, negative electrodes each comprising a copper foil and, as formed on either side thereof, a 50 μm-thick negative electrode mix layer were fabricated.

Preparation of a Nonaqueous Electrolyte

In a 2:3 (v/v) mixture of ethylene carbonate and diethyl carbonate was dissolved 1 mole/liter of lithium hexafluorophosphate ($LiPF_6$) to prepare a nonaqueous electrolyte.

Battery Assembling

Using the above positive electrode, negative electrodes, and nonaqueous electrolyte, cylindrical (AA size) nonaqueous electrolyte secondary batteries (cells of the invention) A1 (X=0.5), A2 (X=1), and A3 (X=2) were assembled.

EXAMPLES 4~6

Except that the negative electrode was fabricated using a negative electrode mix slurry comprising natural graphite powder, styrene-butadiene rubber, and, in lieu of the sodium salt, carboxymethylcellulose lithium salt in a weight ratio of 99–Y:1:Y (Y=0.5, 1, or 2), cells of the invention A4 (Y=0.5), A5 (Y=1), and A6 (Y=2) were assembled in otherwise the same manner as Examples 1~3.

EXAMPLES 7~9

Except that the negative electrode was fabricated using a negative electrode mix slurry comprising natural graphite powder, styrene-butadiene rubber, and, in lieu of the sodium salt, carboxymethylcellulose potassium salt in a weight ratio of 99–Z:1:Z (Z=0.5, 1, or 2), cells of the invention A7 (Z=0.5), A8 (Z=1), and A9 (Z=2) were assembled in otherwise the same manner as Examples 1~3.

Comparative Examples 1 and 2

Using a negative electrode mix slurry comprising natural graphite powder, styrene-butadiene rubber, and CMC sodium salt in a weight ratio of 96:1:3 or 95:1:4, a negative electrode was fabricated. Then, the assembling procedure of Examples 1~3 was repeated to provide comparative cells B1 (X=3) and B2 (X=4). Comparative Examples 3 and 4

Using a negative electrode mix slurry comprising natural graphite powder, styrene-butadiene rubber, and CMC lithium salt in a weight ratio of 96:1:3 or 95:1:4, a negative electrode was fabricated. Then, the assembling procedure of Examples 4~6 was repeated to provide comparative cells B3 (Y=3) and B4 (Y=4).

Comparative Examples 5 and 6

Using a negative electrode mix slurry comprising natural graphite powder, styrene-butadiene rubber, and CMC potassium salt in a weight ratio of 96:1:3 or 95:1:4, a negative electrode was fabricated. Then, the assembling procedure of Examples 7~9 was repeated to provide comparative cells B5 (Z=3) and B6 (Z=4).

Comparative Examples 7~11

Except that the negative electrode was fabricated using a negative electrode mix slurry comprising natural graphite powder, styrene-butadiene rubber, and, in lieu of the sodium salt, carboxymethylcellulose ammonium salt in a weight ratio of 99–Q:1:Q (where Q=0.5, 1, 2, 3, or 4), the assembling procedure of Examples 1~3 was repeated to provide comparative cells B7 (Q=0.5), B8 (Q=1), B9 (Q=2), B10 (Q=3), and B11 (Q=4).

Comparative Examples 12~16

Except that the negative electrode was fabricated using a negative electrode mix slurry comprising natural graphite powder, styrene-butadiene rubber, and, in lieu of the sodium salt, carboxymethylcellulose in a weight ratio of 99–R:1:R (where R=0.5, 1, 2, 3, or 4), the assembling procedure of Examples 1~3 was repeated to provide comparative cells B12 (R=0.5), B13 (R=1), B14 (R=2), B15 (R=3), and B16 (R=4).

Load Characteristics of the Batteries

Each battery was charged to 4.1 V at 1C and, then, discharged to 2.75 V at 1C at 25° C. to determine the discharge capacity C1. Separately, each battery was charged to 4.1 V at 1C and discharged to 2.75 V at 2C at 25° C. to determine the high-rate discharge capacity C2. Using the percentage of C2 relative to C1, i.e. $P(\%)[(C2/C1) \times 100]$, as an indicator, the load characteristic of each battery was evaluated. The greater the value of P is, the better is the load characteristic of the battery. The data are presented in FIG. 1. In FIG. 1, P(%) is plotted on the ordinate and the proportion (weight %) of the carboxymethylcellulose (CMC), an alkali metal salt thereof (CMC-A), or an ammonium salt thereof (CMC-$NH_4$) in the negative electrode mix is plotted on the abscissa.

As can be seen from FIG. 1, A1~A9, cells of the invention, in which the thickening agent (alkali metal salt of carboxymethylcellulose) accounts for 0.5%~2% of the total negative electrode mix, have a P value of 100%, whereas the P values of comparative cells B1~B6 wherein the thickening agent accounts for 3% or 4% are about 55~85%. Comparative cells B7~B9 and B12~B14 in which the proportion of the thickening agent (either CMC-$NH_4$ or CMC) is 0.5%~2% have P values of about 70~85%, which are somewhat larger than the P values (about 55%, 35%, 45% and 25%) of comparative cells B10, B11, B15, and B16 in which the thickening agent accounts for 3% or 4% of the negative electrode composition but are by far smaller than the P value of cells of the invention A1~A9. It is apparent from the above results that in order to implement nonaqueous electrolyte secondary batteries with a satisfactory load characteristic, it is necessary to use an alkali metal salt of carboxymethylcellulose as the thickening agent and control its proportion within the range of 0.5–2 weight % based on the total negative electrode mix.

Relation Between the Kind of Carbon and the Load Characteristic of the Cell

Coke with an average particle diameter of 20 μm (Lc=50 Å, $d_{002}$=3.45 Å) or an organic precursor carbonization product with an average particle diameter of 20 μm (Lc=8 Å, $d_{002}$=3.45 Å) was kneaded with styrene-butadiene rubber latex, carboxymethylcellulose sodium, and water to prepare a negative electrode mix slurry comprising the carbon, styrene-butadiene rubber, and CMC sodium salt in a weight ratio of 98:1:1. As the organic precursor carbonization product, a powder obtained by carbonizing polyacrylonitrile in a nitrogen atmosphere at 700° C. for 2 hours and pulverizing the carbonized polymer in a mill to an average particle diameter of 20 μm was used.

Except that the negative electrode was fabricated using the above negative electrode mix slurry, the cell assembling procedure of Examples 1–3 was repeated to provide cells of the invention, A10 (coke was used as the carbon material) and A11 (an organic precursor carbonization product was used as carbon material).

Separately, using a negative electrode mix slurry containing said coke or organic precursor carbonization product, styrene-butadiene rubber, and carboxymethylcellulose sodium in a weight ratio of 96:1:3, comparative cells B17 (the above coke was used as the carbon material) and B18 (the above organic precursor carbonization product was used as the carbon material) were assembled in the same manner as above.

Then, the P value of each cell was determined by the procedure described hereinbefore to evaluate the load characteristic of the cell. The results are shown in Table 1. Also shown as references in Table 1 are the load characteristics of the cell of the invention A2 (the weight ratio of natural graphite powder, styrene-butadiene rubber, and sodium salt= 98:1:1) and comparative cell B1 (the weight ratio of natural graphite powder, styrene-butadiene rubber, and sodium salt= 96:1:3).

TABLE 1

| Battery | Carbon | CMC—Na content (weight %) | P (%) |
|---|---|---|---|
| A2 | Natural graphite | 1 | 100 |
| A10 | Coke | 1 | 95 |
| A11 | Organic precursor carbonized | 1 | 95 |
| B1 | Natural graphite | 3 | 80 |
| B17 | Coke | 3 | 85 |
| B18 | Organic precursor carbonized | 3 | 85 |

It is apparent from Table 1 that the P value of cell A2 of the invention is larger than the P values of cells A10 and A11 of the invention. This finding indicates that when the CMC sodium salt content is 1 weight %, the use of natural graphite as the carbon material is preferred for the attainment of batteries with a satisfactory load characteristic. It was also established that when the proportion of the CMC alkali metal salt, even if not the sodium salt, is within the range defined in this specification (0.5–2 weight %), the use of natural graphite as the carbon material is recommendable. It was also found that even if it is not natural graphite, the use of a carbon material of high graphitization degree with an Lc value of not less than 150Å and a $d_{002}$ value of not greater than 3.38 Å results in implementation of batteries having as satisfactory load characteristics as those obtainable with natural graphite. Incidentally, since the P value of comparative cell B1 is smaller than the P values of comparative cells B17 and B18, it is clear that the use of natural graphite is rather objectionable when the sodium salt content is greater than 2 weight %.

Thus, because an alkali metal salt of carboxymethylcellulose which is more electrically conductive than the conventional thickening agent carboxymethylcellulose or CMC ammonium salt is used as a thickening agent in the fabrication of the negative electrode, the nonaqueous electrolyte secondary battery of the present invention has an excellent load characteristic.

What is claimed is:

1. A negative electrode for a nonaqueous electrolyte secondary battery, comprising a substrate coated with a slurry consisting essentially of a carbon material, an alkali metal salt of carboxymethylcellulose, and a styrene-butadiene rubber, wherein said alkali metal salt of carboxymethylcellulose accounts for 0.5–2 weight % based on the total weight of said carbon material, styrene-butadiene rubber, and alkali metal salt.

2. The negative electrode for a nonaqueous electrolyte secondary battery according to claim 1, wherein said alkali metal salt of carboxymethylcellulose is the corresponding sodium salt, potassium salt or lithium salt.

3. The negative electrode for a nonaqueous electrolyte secondary battery according to claim 1, wherein said carbon material has a crystallite dimension in the direction of c-axis of not less than 150 Å and a lattice plane (002) d value ($d_{002}$) of not greater than 3.38 Å.

* * * * *